(12) United States Patent
Saleh et al.

(10) Patent No.: US 8,907,050 B2
(45) Date of Patent: Dec. 9, 2014

(54) POLYMERIC ADDITIVE FOR STRENGTH, DEFORMABILITY, AND TOUGHNESS ENHANCEMENT OF CEMETITIOUS MATERIALS AND COMPOSITES

(71) Applicants: Navid Saleh, Irmo, SC (US); Paul Ziehl, Irmo, SC (US); Fabio Matta, Columbia, SC (US); Nirupam Aich, Columbia, SC (US); Nima Zohhadi, Columbia, SC (US); Iftheker A. Khan, Columbia, SC (US)

(72) Inventors: Navid Saleh, Irmo, SC (US); Paul Ziehl, Irmo, SC (US); Fabio Matta, Columbia, SC (US); Nirupam Aich, Columbia, SC (US); Nima Zohhadi, Columbia, SC (US); Iftheker A. Khan, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 13/892,780

(22) Filed: May 13, 2013

(65) Prior Publication Data
US 2013/0324674 A1 Dec. 5, 2013

Related U.S. Application Data (60) Provisional application No. 61/645,851, filed on May 11, 2012.

(51) Int. Cl.
| | | |
|---|---|---|
| *C04B 24/28* | (2006.01) | |
| *C04B 28/02* | (2006.01) | |
| *C08G 63/02* | (2006.01) | |

(52) U.S. Cl.
CPC ............... *C04B 24/28* (2013.01); *C04B 28/02* (2013.01)
USPC .......................................... 528/393; 528/287

(58) Field of Classification Search
USPC ................................. 528/287, 393
See application file for complete search history.

(56) References Cited

U.S. PATENT DOCUMENTS

2002/0151617 A1* 10/2002 Mao et al. ...................... 523/115
2003/0143258 A1* 7/2003 Knaack et al. ................. 424/426

OTHER PUBLICATIONS

Damtoft et al., "Sustainable development and climate change initiatives", Cem.Concr. Res., 2008, 38, (2), 115-127.
Kim et al., "Probabilistic Optimun Inspection/Repair Planning to Extend Lifetime of Deteriorating Structures", J. Perform. Constr. Facil., 2011, 25, (6), 534-544.
Moradi-Marani et al., "Investigation of Corrosion Damage and Repair System in a Concrete Jetty Structure", J. Perform. Constr. Facil., 2010, 24, (4), 294-301.
Qiao et al., "Property evaluation of magnesium phosphate cement mortar as patch repair material", Constr. Build. Mater., 2010, 24, (5), 695-700.
Doyle et al., "Aging Infrastructure and Ecosystem Restoration", Science, 2008,319, (5861), 286-287.
"Report Card for America's Infrastructure", American Society of Civil Engineers, 2005.
Alsulaikmani et al., "Shear repair for reinforced-concrete by fiberglass plate bonding", ACI Struct. J., 1994, 91, (4), 458-464.
Sharif et al., "Strengthening of shear-damaged RC beams by external bonding of steel plates", Mag. Concr. Res., 1995, 47, (173), 329-334.
Tabor, L. J., "Repair materials and techniques, In Durability of Concrete Structures: Investigation, Repair, Protections", Ed. Spon, Press, 1990.
Bissonnette et al., "Tensile creep at early ages of ordinary of ordinary, silica fume and fiber-reinforced concretes", Cem.Concr. Res., 1995, 25, (5). 1075-1085.
Toutanji, H. A., "Properties of polypropylene fiber reinforced silica fume expansive-cement concrete", Constr. Build. Mater., 1999, 13, (4), 171-177.
Seehra et al., "Rapid setting magnesium phosphate cement for quick repair of concrete pavements—Characterization and durability aspects", Cem.Concr. Res., 1993,23, (2), 254-266.
Kardon, J. B., "Polymer-modified concrete: Review", J. Mater. Civ. Eng., 1997, 9, (2), 85-92.
Fowler, D. W., "Polymers in concrete: a vision for the 21st century", Cem.Concr.Compos., 1999, 21, (5-6), 449-452.
Ohama, Y., "Recent progress in concrete-polymer composites", Adv. Cem. Based Mater., 1997, 5, (2), 31-40.
Ohama, Y., "Polymer-based admixtures", Cem.Concr.Compos., 1998, 20, (2-3), 189-212.
Bonacci et al., "Externally bonded fiber-reinforced polymer for rehabilitation of corrosion damaged concrete beams", ACI Struct. J., 2000,97, (5), 703-711.
Karbhari et al., "Fiber reinforced composites—Advanced materials for the renewal of civil infrastructure", Appl. Compos. Mater., 2000, 7, (2-3), 95-124.
Pantazopoulou et al., "Repair of corrosion-damaged columns with FRP wraps", J. Compos. Constr., 2001, 5, (1), 3-11.
Wang et al., "Rehabilitation of cracked and corroded reinforced concrete beams with fiber-reinforced plastic patches", J. Compos. Constr., 2004, 8, (3), 219-228.
Morgan, D. R., "Compatibility of concrete repair materials and systems", Constr. Build. Mater., 1996, 10, (1), 57-67.
Wipf et al., "Evaluation of repair materials for use in patching damaged concrete", Department of Civil, Construction and Environmental Engineering, Iowa State University, 2004.

(Continued)

Primary Examiner — Terressa Boykin
(74) Attorney, Agent, or Firm — Dority & Manning, P.A.

(57) ABSTRACT

Methods are generally provided for forming a polymer-cement composite. In one embodiment of the method, a plurality of dopamine monomers is dispersed in a buffer solution. Polymerization of the dopamine monomers can then be initiated, and a cement-sand mixture can be added to the buffer solution to form a composite mixture. Finally, the composite mixture can be cured to form a polymer-cement composite. Polymer-cement composites are also generally provided that, in one embodiment, include cement, sand, and poly(dopamine), with the polymer-cement composite having a compressive strength of 8000 psi.

12 Claims, 10 Drawing Sheets

(56) References Cited

OTHER PUBLICATIONS

Ohama et al., "Pore-size distribution and oxygen diffusion resistance of polymer-modified mortars", Cem.Concr. Res., 1991, 21, (2-3), 309-315.

Kim et al., "Mechanical performance of sprayed engineered cementitious composite using wet-mix shotcreting process for repair applications", ACI Mater. J., 2004, 101, (1), 42-49.

Medeiros et al., "Influence of EVA and acrylate polymers on some mechanical properties of cementitious repair mortars", Constr. Build, Mater., 2009, 23, (7), 2527-2533.

Walters et al., "State of the art report on polymer modified concrete", ACI Mater. J., 1994,91, (5), 511-515.

Ali et al., "Flexural behaviour of reinforced concrete beams repaired with styrene-butadiene rubber latex, silica fume and methylcellulose repair formulations", Mag. Concr. Res., 1999, 51, (2), 113-120.

Azizian et al., "Environmental impact of highway construction and repair materials on surface and ground waters: Case study: crumb rubber asphalt concrete.", Waste Manage., 2003, 23, (8), 719-728.

Babaee et al., "Kinetics of styrene biodegradation in synthetic wastewaters using an industrial activated sludge", Journal of Hazardous Materials, 2010, 184, 111-117.

Lee et al., "Mussel-Inspired Adhesives and Coatings", Annual Review of Materials Research, 2011, 41, 99-132.

Lee et al., "Mussel-inspired surface chemistry for multifunctional coatings", Science, 2007,318, (5849), 426-430.

Lee et al., "A reversiole wet/dry adhesive inspired by mussels and geckos", Nature, 2007, 448. (7151), 338-U4.

Saleh et al., "Aggregation kinetics of multiwalled carbon nanotubes in aquatic systems: Measurements and environmental implications", Environ. Sci. Technol., 2008, 42, (21), 7963-7969.

Saleh et al., "Influence of biomacromolecules and humic acid on the aggregation kinetics of single-walled carbon nanotubes", Environ. Sci. Technol., 2010, 44. (7), 2412-2418.

Ibrahim et al., "Utilization of Trimethylolpropane Based Hyperbranched Poly(Amine-Ester) as New Polymeric Admixture", Open Journal of Organic Polymer Materials, 2012,2, 23-28.

* cited by examiner

POLYMERIC ADDITIVE FOR STRENGTH, DEFORMABILITY, AND TOUGHNESS ENHANCEMENT OF CEMETITIOUS MATERIALS AND COMPOSITES

PRIORITY INFORMATION

The present application claims priority to U.S. Provisional Patent Application Ser. No. 61/645,851 titled "Bio-Inspired Polymeric Additive for Strength, Deformability, and Toughness Enhancement of Cemetitious Materials and Composites" of Saleh, et al. filed on May 11, 2012, the disclosure of which is incorporated by reference herein.

BACKGROUND

Concrete is one of the most consumed substances with two billion tons in annual production, involving at least 5% annual anthropogenic global $CO_2$ emission. As a building material, concrete offers high compressive strength at low cost; however, it suffers from low tensile and flexural strength. Thus, concrete generally requires bulky cross-sectional geometries, sometimes in combination with pre-stressed or post-tensioned reinforcing, to minimize potential cracking Even when such measures are used, the resulting product remains highly susceptible to compromised durability. Such durability issues have been magnified during the last decade through the aging infrastructure (nearing end of design life) of the United States. The recent catastrophic bridge collapses in Pennsylvania (partial) and Minnesota (complete) have refocused attention toward structural evaluation and rehabilitation. Over $1.5 trillion is estimated to be required to perform repair and restoration of concrete structures for achieving acceptable levels of safety and function. This large restoration effort warrants advanced materials to ensure longer lifespan for new construction as well as for repair of existing structures, thereby minimizing resurgent rehabilitation cost. Other applications for concrete also suffer from the inherent brittleness of the material and manifest themselves in high rates of rejection of the finished product. Such applications include, but are not limited to, cellular concrete, autoclaved aerated concrete, and many others.

Existing methods for structural restoration include physical repair by external plate attachment and chemical attachment through patching. Patching, one of the popular techniques for localized damage repair, uses cement mortar, enhanced with both inorganic (e.g., fumed silica and magnesium phosphate) and polymeric admixtures. Pre-made polymer fiber reinforcements are also used for conditioning of damaged concrete surfaces and components. However, most research has concentrated on improving cement mortar patch properties to provide improved durability of the patches. In situ polymerization during mortar hardening is known to have remarkable chemical advantages, particularly through the polymer-cement bonding via the active ions in cement. The polymer choice in the cement matrix is thus driven by this mutual compatibility between the polymers and the cement matrix.

Relatively better tensile properties of the polymer fibers (compared to that of cement) and the functional groups along the polymer backbone, for effective binding with cement cations (e.g., $Ca^{2+}$ and $Al^{3+}$) encouraged the use of polymer as additives in structural repair. The selection of polymer is dominated by the chemical compatibility and cement workability. Esters, vinyl-alcohols, acetates, styrenes, epoxy, and synthetic rubber are the most commonly used polymers due to their inherent chemical compatibility properties. The other advantage of these polymer admixtures is low water permeability which increases corrosion and freeze-thaw resistance of concrete structures. Moreover, relatively faster curing time for polymer enhanced concrete has allowed for their widespread marketization and usage in floorings and pavements, waterproofing, adhesion, decorative coatings, bridge deck coverings, anticorrosive coatings, etc. However, most polymer enhanced cementitious applications require high polymer:cement ratios and thus leave the challenge of inflated cost.

Though the polymeric admixtures allow for better integration of the patchwork with the existing damaged structure, durable and effective patching requires high amounts (10-20 wt % of cement) of polymer addition. Such high amounts of polymer necessitate addition of other admixtures to maintain proper workability and to minimize air-entrainment. Such chemical additions result in exorbitant cost and this is noted as the primary challenge in making the technology more effective. The cost of repair limits its applicability in large scale structures, such as, pavements, foundations, and substructure and superstructure components for bridges. Moreover, most polymers used in polymer-enhanced mortar are known to elicit toxic response to aquatic and biologic environments and are also resistant to biodegradation. High amounts of polymer in repair mortar pose significant environmental challenges.

The emergence of polymers from biological origin with higher stiffness and tensile properties presents a novel area for research on polymer-enhanced concrete and mortar.

SUMMARY

Objects and advantages of the invention will be set forth in part in the following description, or may be obvious from the description, or may be learned through practice of the invention.

Methods are generally provided for forming a polymer-cement composite. In one embodiment of the method, a plurality of dopamine monomers are dispersed in a buffer solution. Polymerization of the dopamine monomers can then be initiated, and a cement-sand mixture can be added to the buffer solution to form a composite mixture. Finally, the composite mixture can be cured to form a polymer-cement composite.

Polymer-cement composites are also generally provided that, in one embodiment, include cement, sand, and poly (dopamine), with the polymer-cement composite having a compressive strength of 8000 psi.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

FIGS. 5A, 5B, 5C, and 5D are SEM micrographs with FIG. 5A showing plain mortar matrix, FIG. 5B showing 7 days cured polymer cement matrix, and FIGS. 5C-5D showing 28 days cured polymer-cement matrix. All images were taken on failure surfaces upon completion of the compression tests. All the micrographs for polymer-cement mortar specimens represent the highest concentration of polymer addition, i.e. at 0.5 wt % of cement.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present disclosure is directed to the use of poly(dopamine) as an additive in cement and mortar compositions during the manufacture, repair, or use thereof, along with the resulting compositions and products. Poly (dopamine), the primary biopolymer found in mussel adhesive, can provide improved patching, tensile and toughness, and environmental compatibility.

Figure 4A:
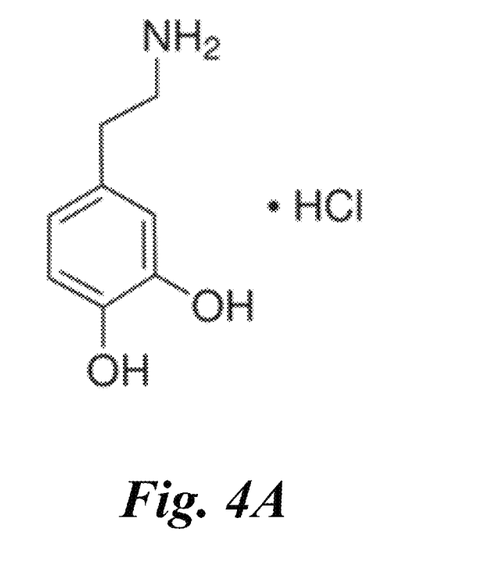
FIGS. 4A, 4B, and 4C are a schematic representation of probable reaction mechanism between polydopamine and cement hydration product, with FIG. 4A representing a single dopamine hydrochloride molecule, FIG. 4B representing a poly(dopamine), and FIG. 4C representing a bonding mechanism of poly(dopamine) with the hydrated cement-sand mixture and polymer cross-linking to form highly compatible and strong polymeric network.

The compressive strength and deformability enhancement of the poly(dopamine) modified cement/mortar material can be attributed to the strong chemical bonding between the polymer backbone and cement matrix as well as the inherently higher strength of poly(dopamine) fibers themselves. The probable reaction mechanism is shown in FIGS. 4A-4C.

Figure 4B:
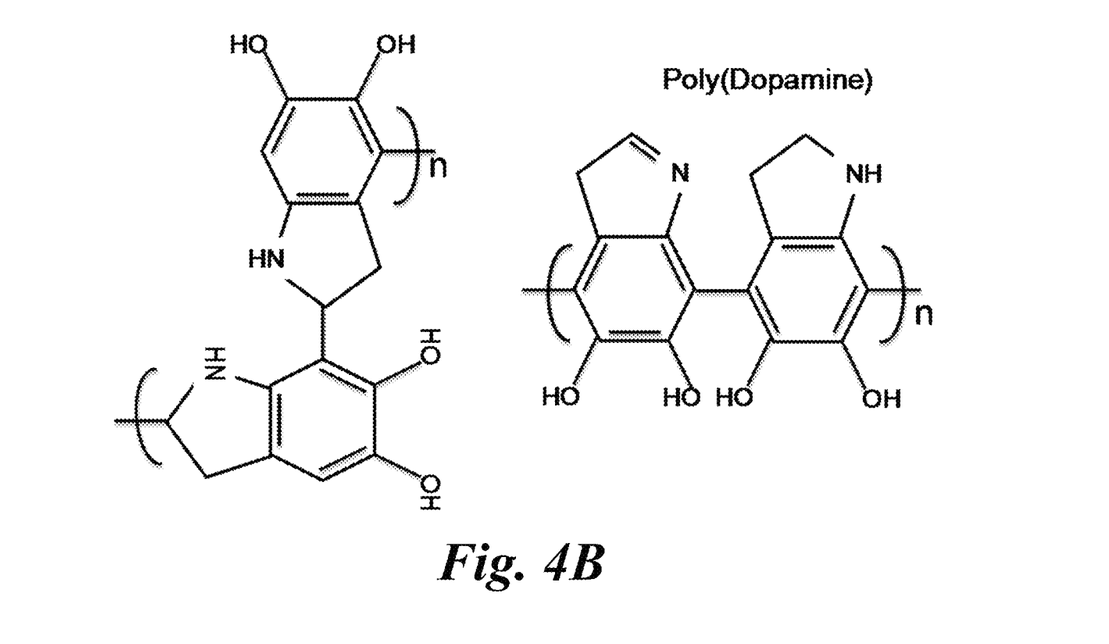
Figure 4C:
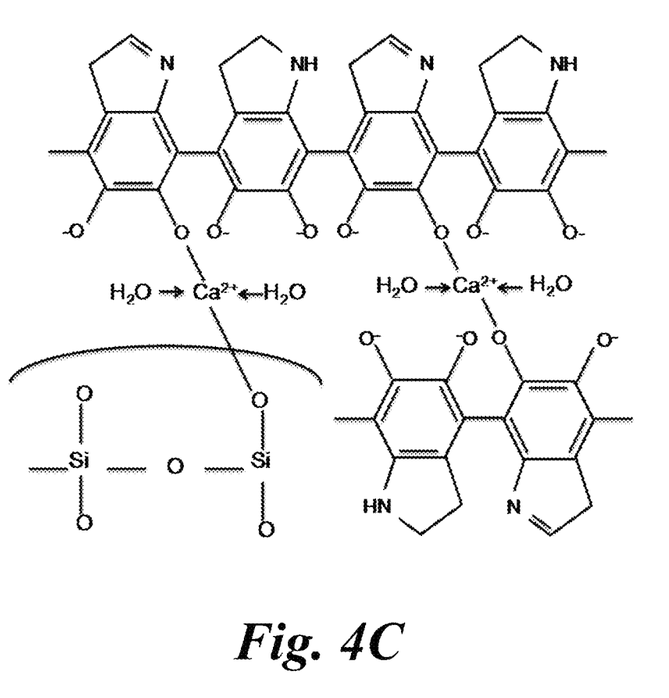
Figures 5A, 5D:
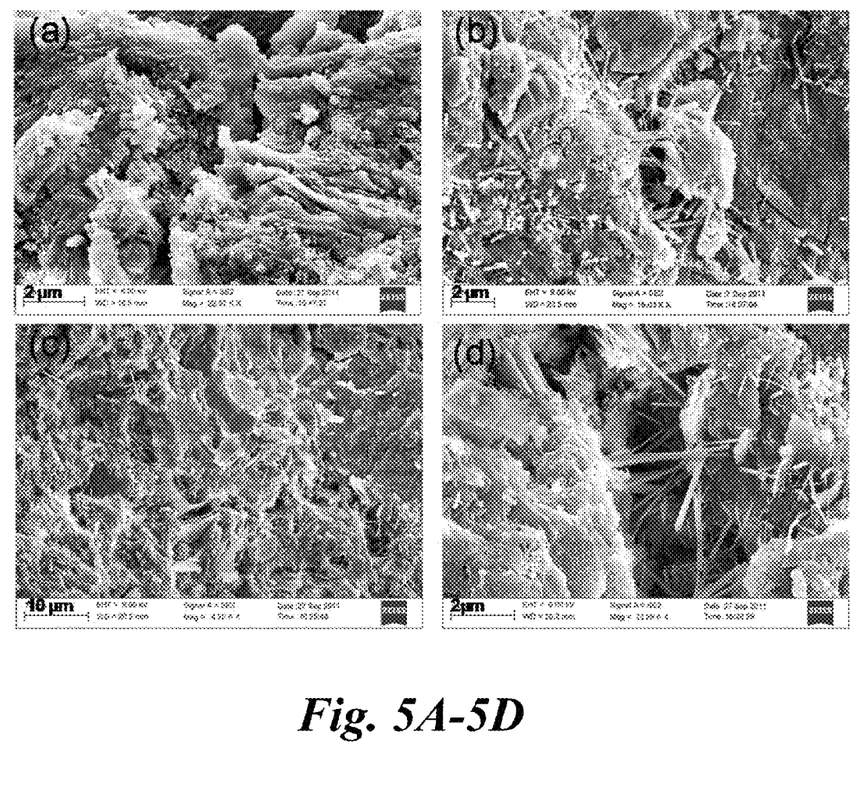

Dopamine hydrochloride (FIG. 4A) molecules, upon addition to a buffer solution (e.g., comprising tris(hydroxymethyl) aminomethane ("Tris")), start to combine with other monomers to initiate the polymerization process (FIG. 4B). The alkaline conditions existing under Tris buffer conditions serves as the initiator for the polymerization process. With the addition of the solution to the cement-sand mixture and curing under saturate lime solution, the polymer continues to form a network within the cement matrix and propagates through the cement-sand solid phases. The highly alkaline condition allows for deprotonation of the phenolic groups that exist in the dopamine hydrochloride molecules and thus generate negatively charged sites along the backbone of the polymer. As the polymerization progresses within the cement matrix, the negatively charged sites prefer to bind electrokinetically to the positively charged sites within the cement structure, i.e., to the $Ca^{2+}$ and $Al^{3+}$ sites (FIG. 4C), and form an integrated network of polymer-cement composite.

In one particular embodiment, the poly(dopamine) is present in the polymer-cement composite at a concentration of 0.1 to 0.4 wt. % of the polymer-cement composite formed according to the method.

The presently described poly(dopamine)-cement composite technology can not only be used in mortars for structural repair and restoration but also for other structural applications such as, autoclaved aerated concrete (AAC), light weight cellulose concrete, high strength-high deformability concrete, quick setting cement, etc. Applicability in such technology market is now discussed, individually.

Patching Admixtures:

Poly(dopamine) can serve as a better alternative to other polymer admixtures for patching mortars. Poly(dopamine) will require $\frac{1}{100}^{th}$ of the mass compared to the best performing polymer admixture, while yielding equal to 60% better strength performance. The lower mass requirement of this polymer will result in significantly lower cost for structural repair.

Bonding Sgent for AAC:

AAC is a light weight concrete which are used in non-load bearing or minimal load bearing structural elements. However, the light weight concrete exhibits extremely low strength and high brittleness. These properties could not be enhanced for the past 50 years with any cost-effective admixtures. Moreover, AAC blocks are also used as a backing material for low cost facing surfaces. The latter application requires strong bonding between the AAC surface and the facing blocks. Poly(dopamine) can serve not only as a strength enhancing agent for the AAC and thereby revolutionize this green engineering product, but also to better bond the AAC surfaces to other facing blocks.

In Light-Weight Cellulose Concrete:

Light weight cellulosic concrete blocks and pumped cellulose concrete have a large market demand. However, the compressive strength of cellulose blocks does not exceed more than 250 psi. The poly(dopamine) has a high likelihood to be compatible with the cellulose system and has ability to provide with a stronger cellulose concrete without compromising the light weight factor and also in a low cost. Pumped cellulose concrete suffers from dimensional instability and the poly(dopamine) is likely to minimize this issue.

As High Strength-High Deformability Concrete:

The simultaneous high strength and high deformability provided by the poly(dopamine)-cement composites can be used to target a specialty concrete market. It is to be noted here that all the test results presented are without the presence of any aggregates, which mostly contributes to the strength in typical concrete. High strength concrete has compressive strength between 7000 and 14000 psi, however with the presence of aggregates. Compressive strength of 8000 psi was achieved without aggregate and this may be enhanced in the presence of the aggregates. The key here is the simultaneous increase in deformability 100% (compared to regular Portland cement), and the low amount of polymer mass (0.5 wt % of cement) that provided such performance. A cost effective solution to the ultra high strength concrete market can be provided with this technology.

Quick-Setting Cement:

One of the primary challenges in quick-setting is the loss in strength. The fast polymerization rate can be used toward quick-setting cement without a compromise on strength and deformability. In addition, 7 days of curing showed 80% of the strength (of 28 days curing) attainment. Both advantages can be used toward a stronger and effective quick-setting cement.

Mortar and other Applications:

The performance of the mortar between concrete masonry units, clay bricks, and other modular building units is critical to the finished product. The increase in strength combined with increased deformabilty and adhesion are well suited to the mortar market and many other applications where bonding is a critical consideration.

EXAMPLES

The objective of this study was to use poly(dopamine), a biopolymer, as an in situ polymer reinforcing agent to obtain high strength cement mortar. pH controlled buffered solutions of poly(dopamine) was mixed with sand and cement following the ASTM C109 protocol to prepare 2 inch mortar cubes. Cubes were prepared with varied poly(dopamine) concentration (0.1-0.4 wt % of the cement) and cured for 7 and 28 days, followed by compressive strength testing in general conformance with the ASTM C109 protocol (displacement control mode). Mechanisms of poly(dopamine)-cement bonding and the in-situ polymerization process were enumerated using scanning electron microscopy and dynamic light scattering, respectively.

Materials and Methods (a) Polymer-Cement Mortar Specimen Preparation and Compressive Strength Testing:

Dopamine hydrochloride (molecular weight of 189.64 g/mol) and Tris buffered saline solution were procured from Sigma-Aldrich (St. Louis, Mo.). Tris buffer solution was diluted 20 times and pH was controlled at 8.5 through the addition of appropriate amounts of 1 M NaOH before dopamine addition. The ASTM C109 standard protocol was followed to prepare the 2 inch (50 mm) mortar cube specimens with a mixing ratio for cement:sand:water of 1:2.75:0.485. Commercially available type II Portland cement and natural standard (ASTM C778) sand were premixed followed by the addition of required amounts of water to generate the mortar mix. For the polymer-mortar specimens, poly(dopamine) suspension was used (instead of water) at the same quantity to meet the water content requirement. Control specimens were prepared with cement, sand, and water (plain mortar represented as 'P') only. The polymer-mortar specimens used polymer mass at 0.1 (low, L), 0.2 (moderate, M), and 0.4 (high, H) wt % of the Portland cement. The polymer was mixed with the water using a magnetic stirrer immediately 30 seconds prior to mixing with sand and cement. 10 cubes per type of mix were prepared using molds. All cubes were moist-cured for one day, then were demolded and stored under saturated lime water until the compressive strength tests were performed. 5 cubes per type were tested after 7 days and the rest after 28 days. The compression tests were done using an MTS 8210 Material Testing System (MTS Systems Inc., Eden Prairie, Minn.) in displacement control mode with a loading rate of 0.025 in/min.

(b) Characterization of Polymer-Cement Mortar

The surface morphology characterization of the fractured specimens, both control and polymer integrated mortar cubes, were performed using a Zeiss Ultraplus Thermal Field Emission Scanning Electron Microscope (FESEM) (Carl Zeiss Microscopy, LLC, Peabody, Mass.) at the University of South Carolina Electron Microscopy Center. The broken cube fragments were first oven dried at 60° C. to remove most of the moisture content followed by gold coating of the fragment exposed surfaces with sputter coater to increase electrical conductivity. The specimens were then placed inside the vacuum chamber of the FESEM and micrographs were produced for different magnification levels. Multiple samples per type of mortar mix were used and multiple images were taken per sample to ensure reproducibility of the micrographs.

(c) Polymerization Rate Characterization

In order to characterize the polymerization rate of dopamine hydrochloride, time resolved dynamic light scattering (TRDLS) measurements were performed. The measurements were conducted using an ALV/CGS-3 compact goniometer system (ALV-Laser Vertriebsgesellschaft m-bH, Langen/Hessen, Germany) for which detailed protocol is described elsewhere (see, Saleh, N. B.; Pfefferle, L. D.; Elimelech, M., Influence of biomacromolecules and humic acid on the aggregation kinetics of single-walled carbon nanotubes. *Environ. Sci. Technol.* 2010, 44, (7), 2412-2418; and Ibrahim, A. A.; Abdel-Magied, A. E.-S.; Selim, M. S.; Ayoub, M. M. H., Utilization of Trimethylolpropane Based Hyperbranched Poly(Amine-Ester) as New Polymeric Admixture *Open Journal of Organic Polymer Materials,* 2012, 2, 23-28.)

The TRDLS system is equipped with a 22 mW HeNe Laser at 632 nm wavelength and high QE APD detector with photomultipliers of 1:25 sensitivity. For observing the polymerization in this process, a 40 mL solution of 20 times diluted tris buffer with appropriate NaOH to control the pH level at 8.5, was prepared. 160 mg of dopamine hydrochloride was added to the buffer solution and magnetically stirred for 30 seconds prior to sampling for TRDLS measurement. A cleaned borosilicate glass vial was filled with 2 mL polymer suspension and vortex mixed prior to insertion to the TRDLS vat chamber. Continuous data collection at 15 seconds interval was performed for not more than 10 minutes with the laser operating at full exposure level and scattering data collected at a 90° scattering. The increase in polymer cluster size with time was obtained from the scattering data.

Results and Discussion (a) Compressive Strength

Figure 1A:
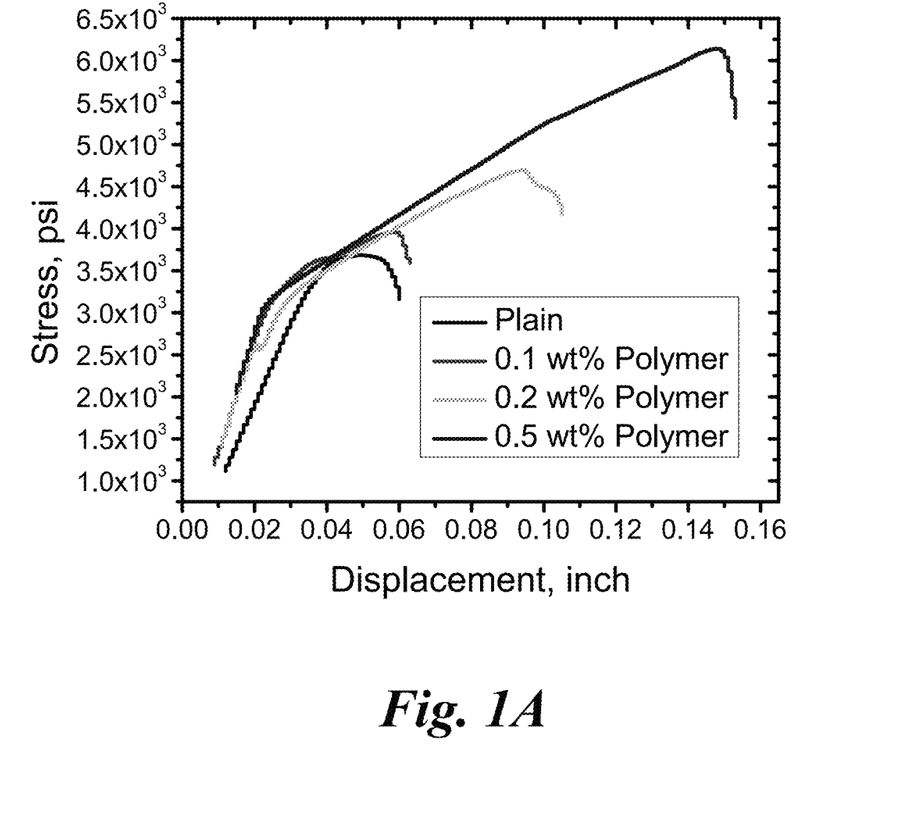
FIG. 1A shows a stress-displacement profiles for the compression tests of control and polymer-cement mortar specimens, according to the Examples, after 7 days curing.
Figure 1B:
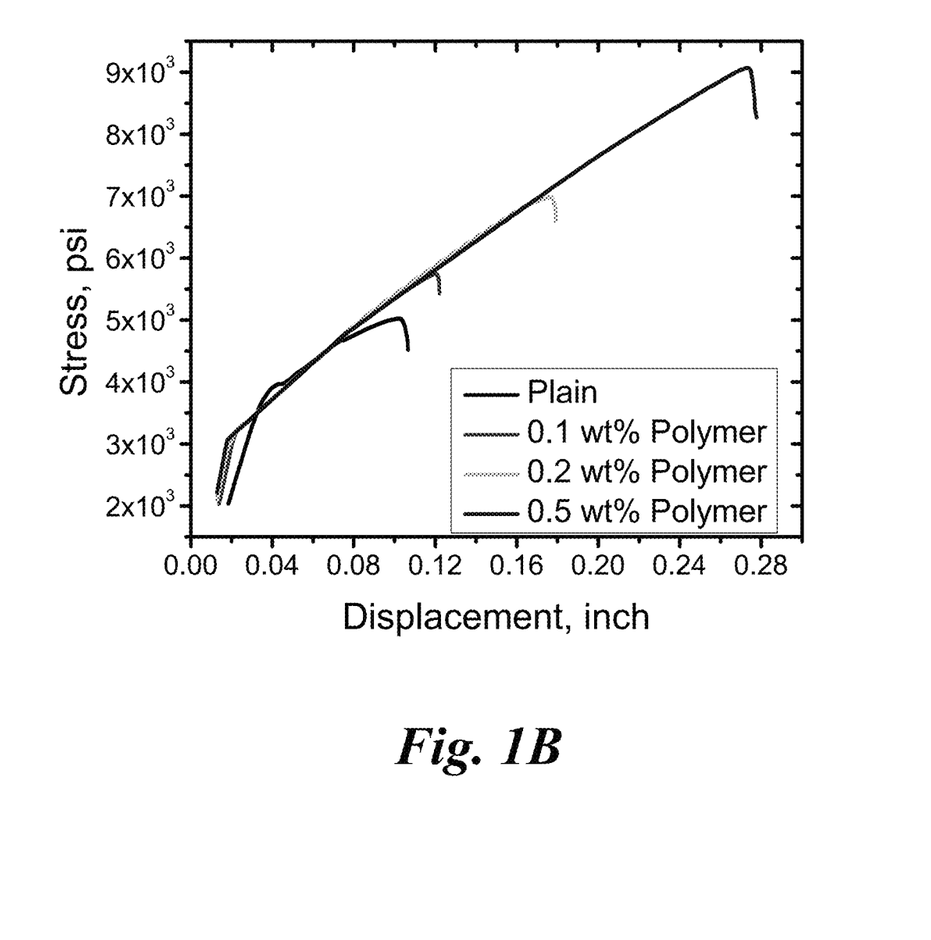
FIG. 1B shows a stress-displacement profiles for the compression tests of control and polymer-cement mortar specimens, according to the Examples, after 28 days curing.
Figure 2A:
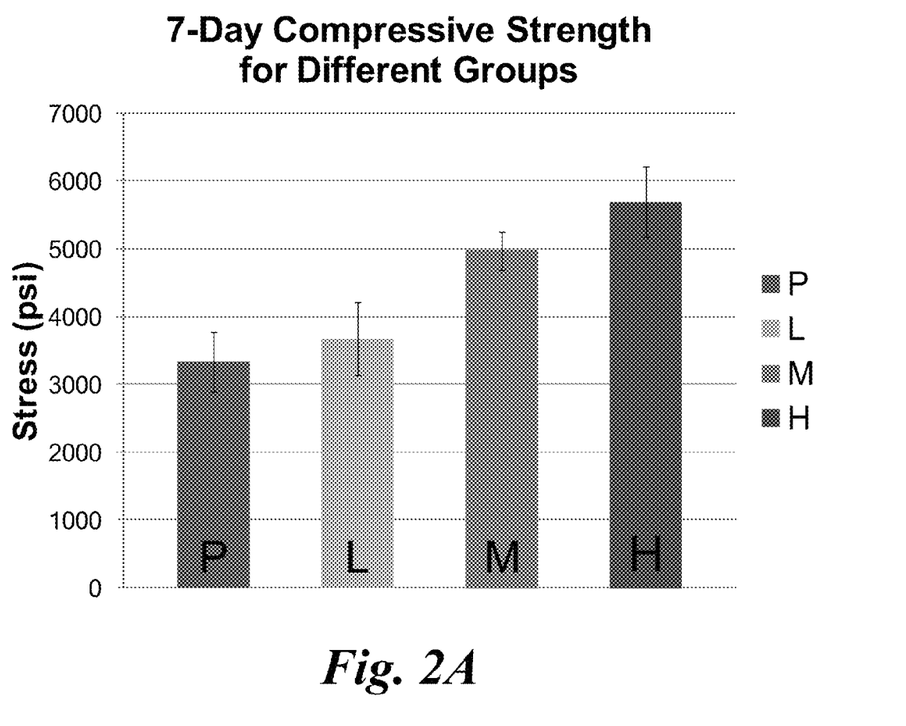
FIG. 2A shows a comparison of compressive strength of the control (P) and polymer-cement mortar specimens with varied polymer concentration (low: L, moderate: M, and high: H) after 7 days curing.
Figure 2B:
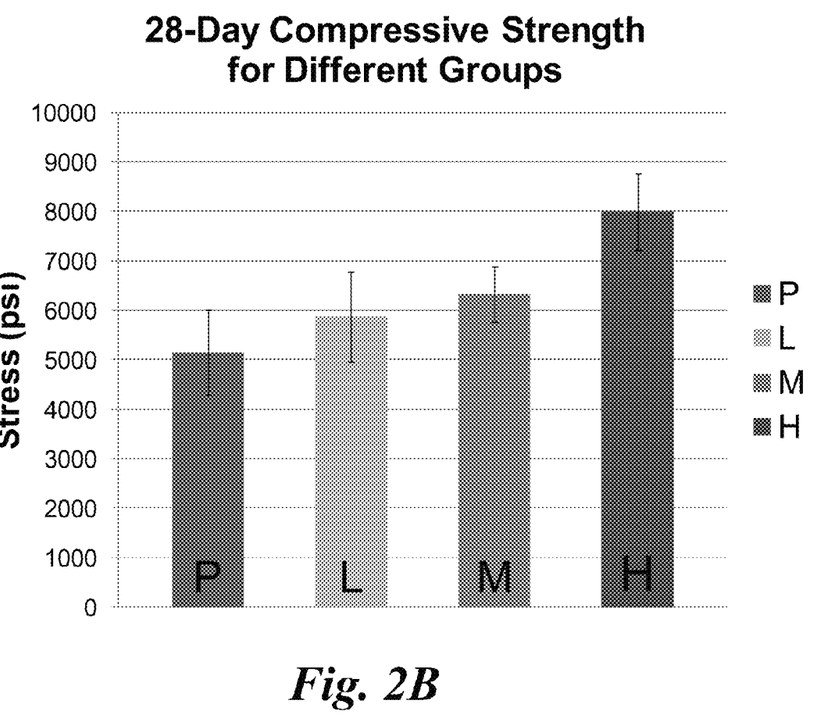
FIG. 2B shows a comparison of compressive strength of the control (P) and polymer-cement mortar specimens with varied polymer concentration (low: L, moderate: M, and high: H) after 28 days curing.
Figure 3A:
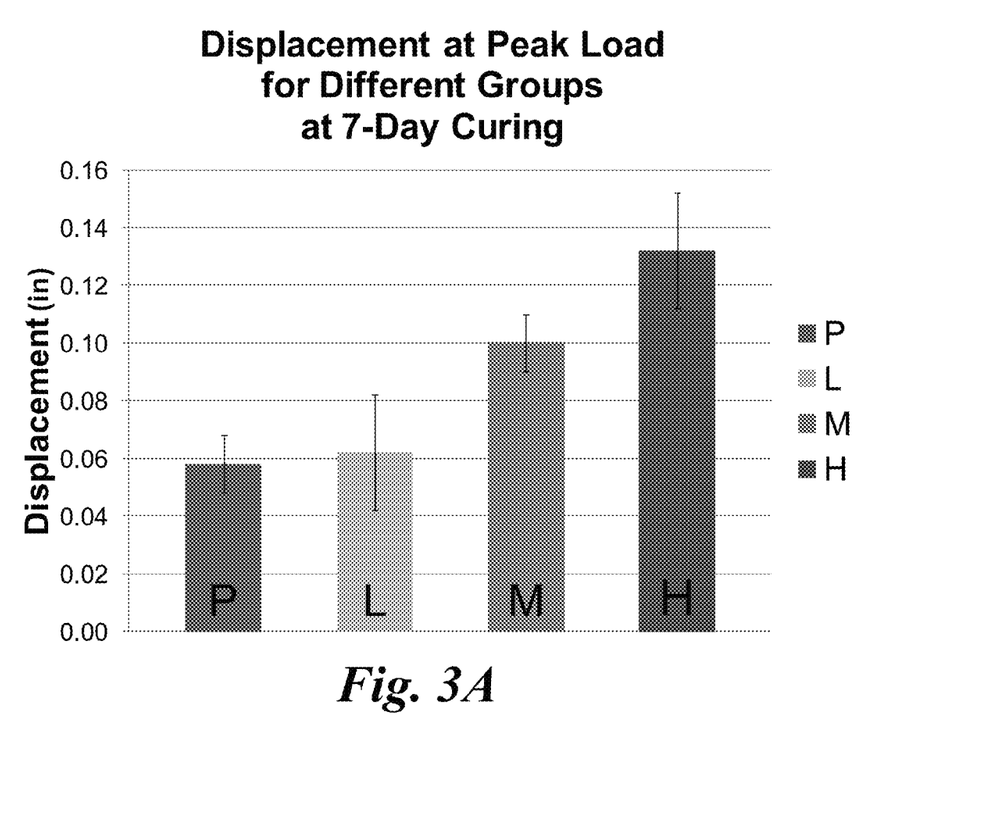
FIG. 3A shows a comparison of displacements at peak load of the control (P) and polymer-cement mortar specimens according to the Examiners with varied polymer concentration (low: L, moderate: M, and high: H) after 7 days curing.
Figure 3B:
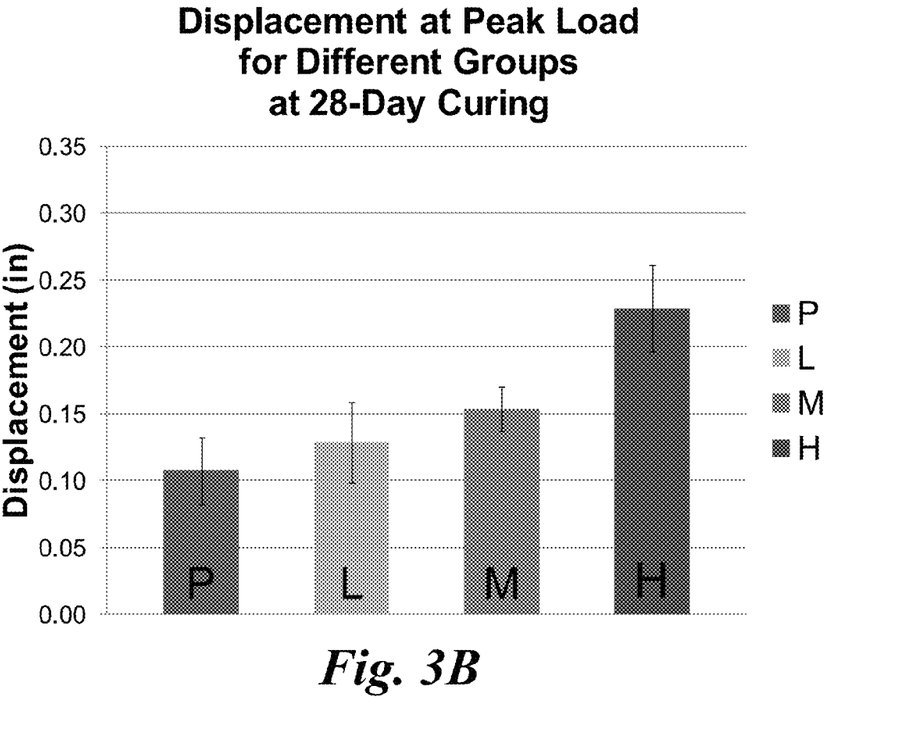
FIG. 3B shows a comparison of displacements at peak load of the control (P) and polymer-cement mortar specimens according to the Examiners with varied polymer concentration (low: L, moderate: M, and high: H) after 28 days curing.

The compression test results for control (P) and polymer-cement mortar specimens at varied polymer concentration (L, M, and H) are shown in FIGS. 1-3. FIG. 1 shows the stress versus displacement curve for 7 days (FIG. 1A) and 28 days of curing (FIG. 1B). The stiffness shows approximately a 20% increase compared to control specimens with H concentrations of polymer additions (28 day curing). The control specimens also show lower ultimate strength with almost no post-peak progression. With increasing amounts of poly (dopamine) in the mix, the post peak behavior shows significant elongation, and yields considerably higher failure loads compared to the control case. Based on the results shown, it is logical to conclude that the tensile strength of the polymer-cement composite will also be enhanced. Moreover, the traditional drawback of increased 'creep' in polymer concrete composites will likely be minimized through a relatively insignificant poly(dopamine) mass requirement for attaining such desirable performance.

Compressive strength increase with the increasing concentration of the poly(dopamine) in the cement mix is evident for both 7 days and 28 days curing periods as shown in FIG. 2A and FIG. 2B, respectively. A 60-70% increase in the compressive strength for the polymer-concrete with the highest concentration of biopolymer was found compared to the control. The average compressive strength values of the control specimen (P) were 3330±360 and 5150±850 psi for 7 and 28 days curing periods, respectively. With the addition of poly(dopamine) the average compressive strength for the 7 day curing period increased to 3670±460, 4980±250, and 5690±460 psi for L, M, and H polymer concentrations, respectively. Polymer-cement mortar specimens demonstrated further enhancement in compressive strength for 28 day curing. The average compressive strength were 5870±810, 6320±500, and 7990±700 psi for L, M, and H cases, respectively.

One of the key features of this polymer enhancement has been found to be the simultaneous improvement in deformability with increase in strength. Displacements at peak load before failure for the polymer modified concrete increased by at least 100% in the presence of 0.5% poly(dopamine) (FIGS. 3A and 3B). The control specimens showed 0.058±0.01 inch and 0.11±0.03 inch average displacements for 7 and 28 day curing periods, respectively. The deformability increased to 0.1±0.01 inch and 0.13±0.02 inch for M and H cases for 7 days during with a further increase to 0.15±0.02 inch and 0.23±0.03 inch for the M and H cases for 28 day curing. However, the L case (i.e., 0.1 wt % polymer) showed no significant enhancement in deformability after 7 days curing, while showing a slight increase to 0.13±0.03 inch upon 28 days curing.

The compressive strength test results demonstrate that poly(dopamine) addition at 0.1-0.5 wt % (L-H amounts) of cement increased the strength up to 8000 psi for 28 days curing, approximately 55% increase in strength. Established literature studies on polymer admixtures showed a maximum increase in compressive strength up to approximately 5000 psi (see e.g., Fowler, D. W., Polymers in concrete: a vision for the 21st century. *Cem. Concr. Compos.* 1999, 21, (5-6), 449-452 and Ohama, Y., Polymer-based admixtures. *Cem. Concr. Compos.* 1998, 20, (2-3), 189-212), however at 20 wt % of cement concentration. A recent study, which appears to be rather unreliable—with no details of cement:sand, with no presentation of relative standard deviation for the results and not following any ASTM standardized protocol—showed an increase of 42% in compressive strength upon addition of branched poly(amine ester) with an addition of 1.7% of the polymer (see, Ibrahim, A. A.; Abdel-Magied, A. E.-S.; Selim, M. S.; Ayoub, M. M. H., Utilization of Trimethylolpropane Based Hyperbranched Poly(Amine-Ester) as New Polymeric Admixture *Open Journal of Organic Polymer Materials*, 2012, 2, 23-28.) This is the only study that presents findings, seemingly unsystematic, showing a high increase in strength with a low addition of a polymer. Whereas the presently described controlled and systematic study showed an average increase of 71% and 55% in compressive strength for 7 days and 28 days curing, respectively, with only 0.5 wt % (of cement) addition of poly(dopamine). The presently described results show use of at least two orders of magnitude lower mass of poly(dopamine) compared to established polymer literature while at least three times lower mass compared to the recent poly(amine ester) study. In addition, the presently described study showed deformability increase of the mortar specimens with 0.5 wt % (of cement) of poly(dopamine) by 113% compared to the control for 28 days curing case. A simultaneous increase of strength (by 55%) and deformability (by 113%) is remarkable.

(b) Mechanisms of Strength Enhancement

The compressive strength and deformability enhancement of the poly(dopamine) modified mortar cubes can be attributed to the strong chemical bonding between the polymer backbone and cement matrix as well as the inherently higher strength of poly(dopamine) fibers themselves. The probable reaction mechanism is shown in FIGS. 4A-4C. Dopamine hydrochloride (FIG. 4A) molecules upon addition to the diluted Tris buffer solution, start to combine with other monomers to initiate the polymerization process (FIG. 4B). The alkaline conditions existing under Tris buffer conditions serves as the initiator for the polymerization process. With the addition of the solution to the cement-sand mixture and curing under saturate lime solution, the polymer continues to form a network within the cement matrix and propagates through the cement-sand solid phases. The highly alkaline condition allows for deprotonation of the phenolic groups that exist in the dopamine hydrochloride molecules and thus generate negatively charged sites along the backbone of the polymer. As the polymerization progresses within the cement matrix, the negatively charged sites prefer to bind electrokinetically to the positively charged sites within the cement structure, i.e., to the $Ca^{2+}$ and $Al^{3+}$ sites (FIG. 4C), and form an integrated network of polymer-cement composite. It is also well known in the literature that poly(dopamine) network possess high tensile strength (~100 kPa) (see, Lee, H.; Lee, B. P.; Messersmith, P. B., A reversible wet/dry adhesive inspired by mussels and geckos. *Nature* 2007, 448, (7151), 338-U4), that has likely contributed to the load bearing capacity of the specimens as observed in the previous section. The simultaneous formation of strong polymer network and bonding between the polymer-cement matrix help to form a chemically compatible polymer-concrete matrix with the ability to withstand high compressive load. Such bonding mechanism can be observed in the electron microscopy images as presented in FIG. 5.

FIGS. 5A-5D represent a comparison of the cementitious microstructure in the control specimen with poly(dopamine)-cement cases for 7 and 28 day curing periods. Compared to the conventional microstructure of concrete (FIG. 5A), integrated polymeric network is clearly evident in for both 7 day (FIG. 5B) and 28 day (FIGS. 5C and 5D) curing periods. The polymer fibers are uniformly distributed and integrated throughout the matrix. Due to the overwhelming amount of complex matrix formation by the poly(dopamine) and cement, the composite structure has allowed for large load bearing capacity and deformation as described in the earlier sections.

(c) Polymer Setting Time

Figure 6:
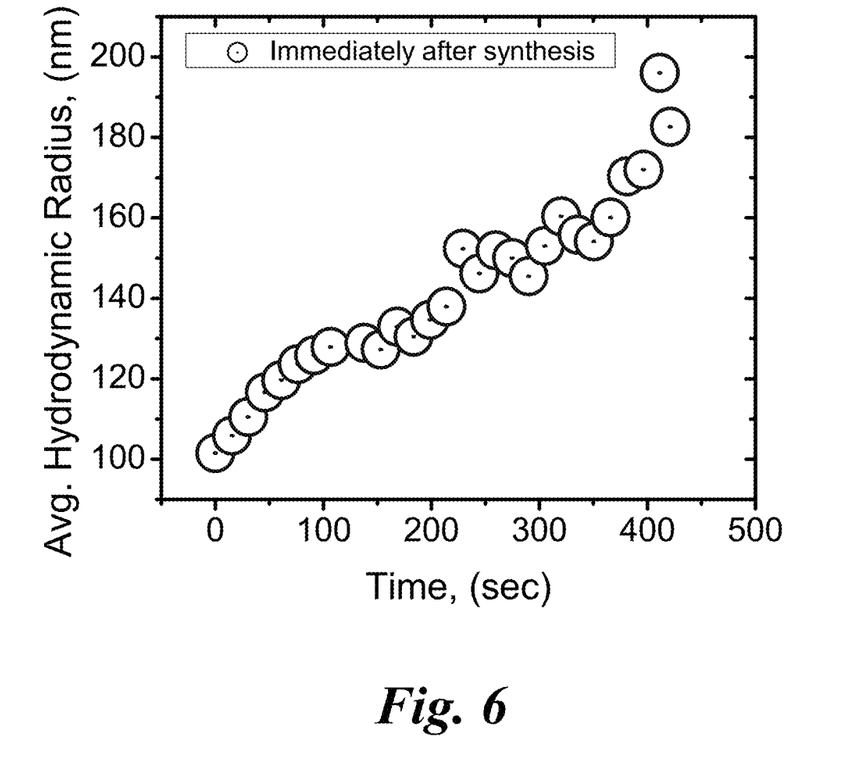
FIG. 6 shows the polymer coil size profile, with the average hydrodynamic radii as presented in the vertical axis represent radius of gyration of the poly(dopamine).

Rate of polymerization of the poly(dopamine) was characterized to evaluate the polymer fiber propagation through the cement matrix. Such rate information is key for quick setting cement applications with polymeric admixtures. Time dependent measurement of the average hydrodynamic radius of poly(dopamine) coil formation is presented in FIG. 6. Within 6 minutes of preparation of the polymeric suspension, the polymer coil size doubled with a subsequent trend of exponential increase. Moreover, images of the actual polymer suspension at different time intervals—initiation, 15 min, 3 hours, and 1 day after initiation showed that the color of the suspension gradually changed from red to light grey, eventually showing micron size black deposits after 1 day of preparation. This fast polymerization rate has likely increased in the presence of cement alkaline environment, as observed through quick cement hardening and strength increase within 7 days of curing.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming a polymer-cement composite, the method comprising:
    diluting a plurality of dopamine monomers in a buffer solution, wherein the buffer solution has an alkaline condition so as to initiate polymerization of the dopamine monomers;
    adding a cement-sand mixture to the buffer solution to form a composite mixture with the buffer solution remaining in an alkaline condition; and
    curing the composite mixture to form a polymer-cement composite, wherein the polymer-cement composite comprises poly(dopamine).

2. The method of claim 1, wherein the polymer-cement composite comprises poly(dopamine) in a concentration of 0.1 to 0.4 wt. % of the polymer-cement composite.

3. The method of claim 1, wherein the buffer solution has a pH of 8.5.

4. The method of claim 1, wherein the dopamine monomers comprise dopamine hydrochloride.

5. The method of claim 1, wherein the buffer solution comprises tris(hydroxymethyl)aminomethane.

6. The method of claim 1, wherein curing of the composite mixture is performed under a saturated lime solution.

7. The method of claim 1, wherein the composite mixture is cured for 7 days.

8. The method of claim 1, wherein the cement-sand mixture comprises cement, sand, and water.

9. A polymer-cement composite, comprising: cement, sand, and poly(dopamine), wherein the polymer-cement composite has a compressive strength of 8000 psi.

10. The polymer-cement composite of claim 9, wherein poly(dopamine) is present in the polymer-cement composite at a concentration of 0.1 to 0.4 wt. % of the polymer-cement composite.

11. The polymer-cement composite of claim 9, wherein the poly(dopamine) electrokinetically binds to the cement to form an integrated network of polymer-cement bonds.

12. The method of claim 1, wherein, upon curing, the poly(dopamine) electrokinetically binds to the cement to form an integrated network of polymer-cement bonds.

* * * * *